US010762577B1

(12) United States Patent
Buerger

(10) Patent No.: US 10,762,577 B1
(45) Date of Patent: Sep. 1, 2020

(54) SYSTEM AND METHOD FOR SECURING INFORMATION IN ELECTRONIC EXCHANGE TRANSACTIONS

(71) Applicant: Dash Investments LLC, Woodland Hills, CA (US)

(72) Inventor: Reid S. Buerger, Ambler, PA (US)

(73) Assignee: Dash Investments LLC, Woodland Hills, CA (US)

( * ) Notice: Subject to any disclaimer, the term of this patent is extended or adjusted under 35 U.S.C. 154(b) by 0 days.

(21) Appl. No.: 16/740,613

(22) Filed: Jan. 13, 2020

Related U.S. Application Data

(63) Continuation of application No. 16/739,221, filed on Jan. 10, 2020.

(51) Int. Cl.
  *G06Q 40/00* (2012.01)
  *G06Q 40/08* (2012.01)
  *G06Q 30/08* (2012.01)
  *G06Q 30/06* (2012.01)

(52) U.S. Cl.
  CPC ......... *G06Q 40/08* (2013.01); *G06Q 30/0611* (2013.01); *G06Q 30/0641* (2013.01); *G06Q 30/08* (2013.01)

(58) Field of Classification Search
  CPC .................................................... G06Q 40/08
  USPC .......................................................... 705/4
  See application file for complete search history.

(56) References Cited

U.S. PATENT DOCUMENTS

| | | | | |
|---|---|---|---|---|
| 8,301,562 B2 * | 10/2012 | Buerger | ................. | G06Q 20/10 705/4 |
| 2005/0187869 A1 * | 8/2005 | Buerger | ................. | G06Q 20/10 705/39 |
| 2006/0206438 A1 * | 9/2006 | Sakaue | .................. | G06Q 40/04 705/80 |
| 2010/0161357 A1 * | 6/2010 | Loy | ....................... | G06Q 40/025 705/4 |
| 2012/0150569 A1 * | 6/2012 | Buerger | ................. | G06Q 20/10 705/4 |
| 2015/0161740 A1 * | 6/2015 | Stuchiner | ............... | G06Q 40/08 705/4 |

OTHER PUBLICATIONS

The Risks of Over the Counter Trading (Year: 2018).*
Magna Life Settlment Industry Report (Year: 2018).*

* cited by examiner

*Primary Examiner* — Bruce I Ebersman
(74) *Attorney, Agent, or Firm* — Meister Seelig & Fein LLP; Seth H. Ostrow, Esq.

(57) ABSTRACT

A method and system for processing electronic offers comprising at least one processing device that submits an electronic offer for a first policy, receives a bid that is responsive to the offer and an acceptance of the bid, and executes a transaction workflow including an agreement with a buyer associated with the bid. In the agreement, the buyer receives the first policy and pays premiums to the first entity that keep the first policy in force, pays certain fees to a second entity, which second entity issues to the owner at least one second policy with a second benefit value based on the life of the insured, the second benefit value comprising a portion of the first benefit value, and pays or causes to be paid to the second entity at least a second benefit value based on the life of the insured.

7 Claims, 12 Drawing Sheets

SYSTEM AND METHOD FOR SECURING INFORMATION IN ELECTRONIC EXCHANGE TRANSACTIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to performing secure exchange transactions involving life insurance policies, and in particular, systems and methods for electronically managing identifying information of electronic exchange transactions.

Description of the Related Art

Due to various reasons such as retirement, health, changes in estate value, estate taxes or premium costs, the owner of a life insurance policy may decide to (i) surrender the policy to the carrier of the policy and receive the cash surrender value (if any) under the policy; (ii) sell the policy to a life settlement company for an amount in excess of the cash surrender value; or (iii) sell the policy to a life settlement company in exchange for the life settlement company's promise to (A) pay the premiums required to keep the policy in force and (B) designate the owner or the owner's beneficiary as an irrevocable beneficiary for a portion of the policy's death benefit.

Commonly assigned U.S. Pat. No. 8,108,308 describes a method for structuring a life settlement with a paid up policy transaction. In the method, a policy holder sells or otherwise exchanges their existing insurance policy on a secondary market. In exchange for selling the insurance policy to a buyer, the buyer purchases a second, paid-up insurance policy in the name of the policy holder as beneficiary and with a death benefit less than the death benefit of the policy holder's policy. The buyer becomes the beneficiary of the first policy. This method represented an improvement over existing life settlement options.

There remains a need in the art for further improvements to life settlement options to increase the benefits to the parties involved.

SUMMARY OF THE INVENTION

The present invention provides a method and system for conducting transactions through an electronic interface. The system comprises at least one processing device and at least one computer readable storage device storing data instructions that, when executed by the at least one processing device, cause the at least one processing device to submit an electronic offer for a first policy that is assigned from an owner of the first policy. The first policy includes a first benefit value on a life of an insured and is issued by a first entity. The offer comprises data including an offer price for the first policy and details regarding the first policy. The processing device is caused to receive a bid that is responsive to the offer and an acceptance of the bid based on a signal from a client device via an application interface. The at least one processing device is further caused to execute a transaction workflow including generating an agreement with a buyer associated with the accepted bid. In the agreement, the buyer receives the first policy and pays premiums to the first entity that keep the first policy in force, pays certain fees to a second entity, which second entity issues to the owner at least one second policy with a second benefit value based on the life of the insured, the second benefit value comprising a portion of the first benefit value, and pays or causes to be paid to the second entity at least a second benefit value based on the life of the insured.

The assignment may be based on a transaction executed by the owner of the first policy with the second entity. In one embodiment, the processing device may be configured to electronically receive the assignment via data entry or file attachment from a computing device associated with the owner of the first policy. The processing device may be further configured to issue the second policy as a paid-up certificate of insurance under a group master policy. In another embodiment, the processing device may be further configured to issue the second policy as an individual paid-up life insurance policy.

The processing device may issue the second policy to the owner wherein the second policy includes a beneficiary that is chosen by the owner. The processing device may also issue the second policy to the owner wherein the owner is not required to pay premiums to keep the second policy in force. The processing device may be further configured to issue the second policy to the owner wherein the first entity pays the first benefit value on the life of the insured to the buyer, the buyer pays or causes to be paid at least the second benefit value on the life of the insured to the second entity, and the second entity pays the second benefit value on the life of the insured to the beneficiary of the second policy.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Figure 1:
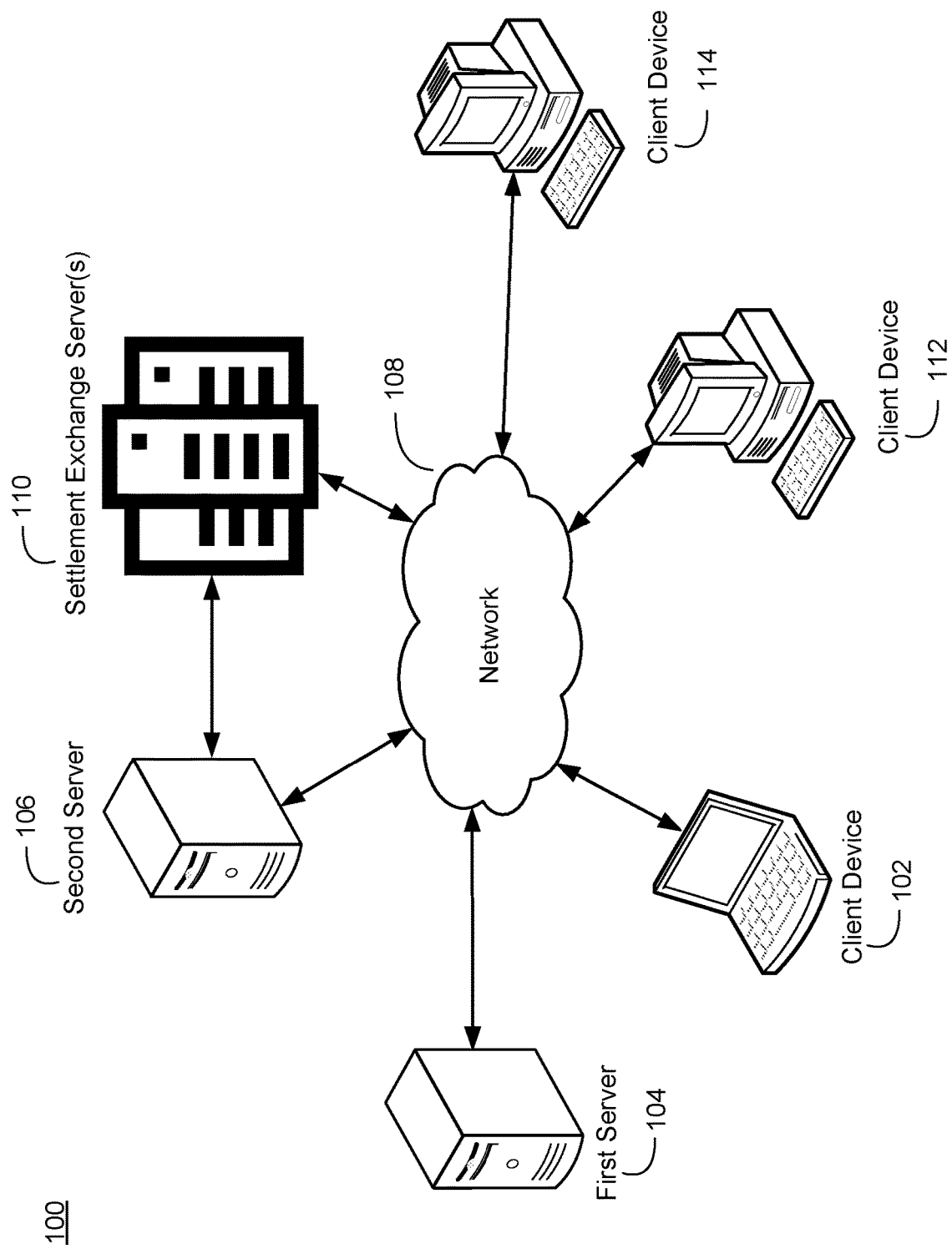
FIG. 1 illustrates a computing system according to an embodiment of the present invention.

FIG. 1 presents a computing system according to an embodiment of the present invention. A computing system 100 may include a client device 102 that can communicate with second server 106 to conduct a life insurance policy transaction through network 108. The life insurance policy transactions may include an assignment of a policy (issued from an entity associated with first server 104) to an entity associated with second server 106. The second server 106 may then subsequently upload the assigned policy on settlement exchange server(s) 110 either via a direct network connection or network 108. Alternatively, the client device 102 may conduct the life insurance policy transaction with the second server 106 and assign the policy to the second server 106 on the settlement exchange server(s) 110. Uploading the assigned policy may include the settlement exchange server(s) 110 generating an assignment entry that may include recording assignment documentation, policy details (e.g., benefits or face value), policy issuer information, and owner information. Assignment of the policy to the second server 106 may allow the second server 106 to list and sell the policy through the settlement exchange server(s) 110.

The settlement exchange server(s) 110 may comprise computing hardware that enable a party to submit a bid to buy one or more issued policies (e.g., client device 112), or an offer to sell one or more issued policies (e.g., second server 106, client device 114, or client device 114 on behalf of second server 106), through an application interface to an electronic exchange network or marketplace via network 108. It is noted that any one of servers and client devices may be used by parties to submit bids and offers through settlement exchange server(s) 110. Bids or offers may be communicated to a processor at settlement exchange server(s) 110, where the bid or offer can be stored in a bid-offer queue. Bids and offers may be sorted based upon time of submission, price, or any other suitable criterion. Bids or offers may be presented to an intended party and once displayed, the bid or offer may be accepted. Bids and offers may include portions indicating a description of an underlying policy, a bid price, and an offer price.

Servers, as described herein, may comprise at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. In an example embodiment, a server may include or have access to memory or computer readable storage devices for storing instructions or applications for the performance of various functions and a corresponding processor for executing stored instructions or applications. For example, the memory may store an instance of the server configured to operate in accordance with the disclosed embodiments.

Client devices 102, 112, and 114 may comprise computing devices (e.g., desktop computers, terminals, laptops, personal digital assistants (PDA), cellular phones, smartphones, tablet computers, or any computing device having a central processing unit and memory unit capable of connecting to a network). Client devices may also comprise a graphical user interface (GUI) or a browser application provided on a display (e.g., monitor screen, LCD or LED display, projector, etc.). A client device may also include or execute an application to communicate content, such as, for example, textual content, multimedia content, or the like. A client device may also include or execute an application to perform a variety of possible tasks, such as browsing, searching, communicating. Client devices may include or execute a variety of operating systems, including a personal computer operating system, such as a Windows, Mac OS or Linux, or a mobile operating system, such as iOS, Android, or Windows Phone, or the like. A client device may include or may execute a variety of possible applications, such as a client software application enabling communication with other devices, such as communicating one or more messages, such as via email, short message service (SMS), or multimedia message service (MMS).

Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine-readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices and servers may be encrypted using, for example, the Advanced Encryption Standard (AES) with a 128, 192, or 256-bit key size, or any other encryption standard known in the art.

Figure 2:
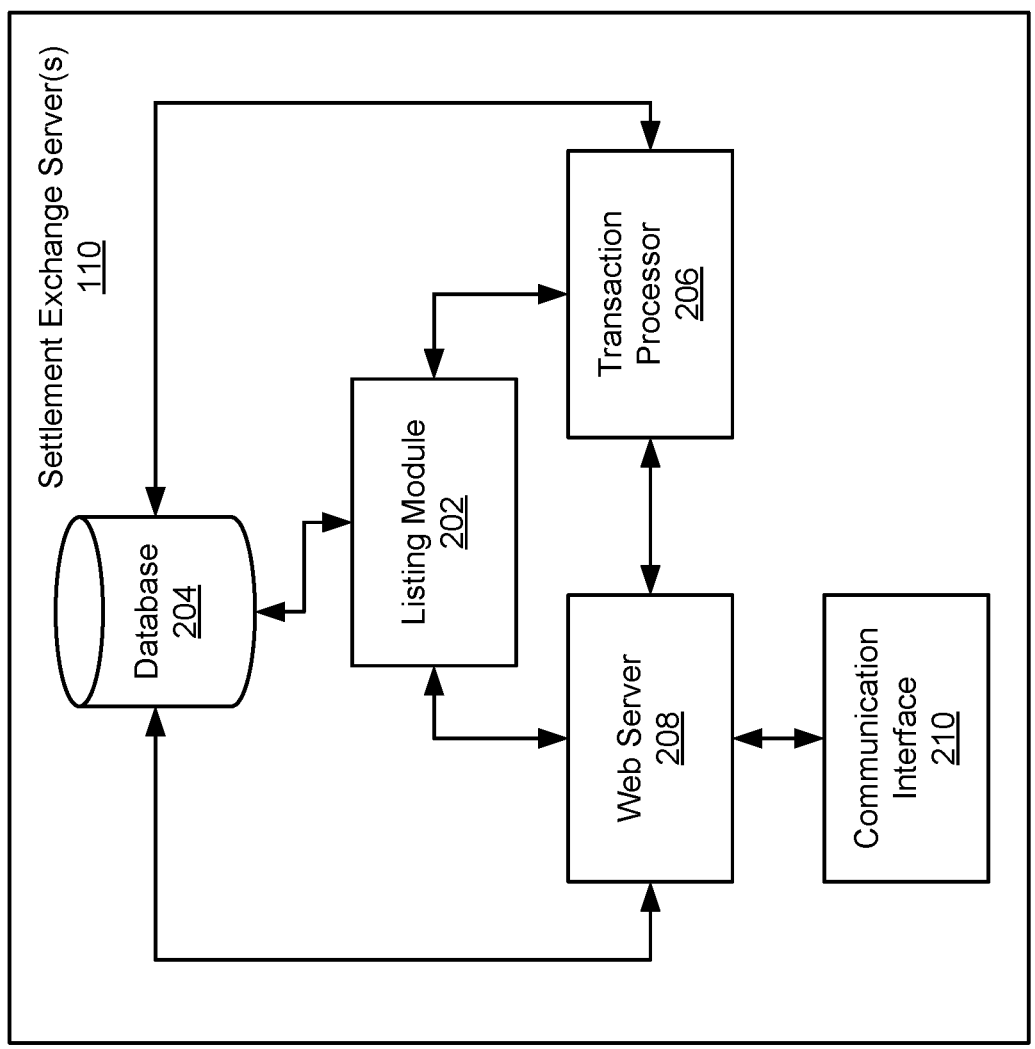
FIG. 2 illustrates a settlement exchange server according to an embodiment of the present invention.

FIG. 2 illustrates a settlement exchange server according to an embodiment of the present invention. Settlement exchange server(s) 110 may include listing module 202, database 204, transaction processor 206, web server 208, and communication interface 210. Client devices and servers of parties may communicate with settlement exchange server(s) 110 by connecting with web server 208 through communication interface 210. Web server 208 may service requests from the client devices and servers over a network communication. Web server 208 may access data stored in database 204. Database 204 may store user profiles of parties including contact information, certifications (e.g., licensing information). The database 204 may be implemented with a group of networked server computers or other storage devices. The web server 208 may authenticate client devices and servers based on information stored in database 204.

Transaction processor 206 may be in communication with an interface used to submit and respond to bids and offers in accordance with the present invention. Bids and offers may be processed by transaction processor 206 and stored to database 204. Bids and offers may include a description of an underlying issued policy, a bid price, or an offer price. Additionally, offers may include documentation, such as proof of policy. Listing module 202 may be accessed through web server 208 to generate a listing of bids and/or offers based on bids and offers retrieved from database 204. The listing of bids and/or offers may be presented to a pool of parties or to a specific party and sorted based upon time of submission, price, or any other suitable criterion.

The bids and/or offers may be selected for entering proposals to transaction processor 206. Transaction processor 206 may be programmed with computer-executable instructions to receive requests, execute the requests, and read/write to database 204 based on the requests. The transaction processor 206 may further execute exchange market functions, such as pairing of bids and offers between parties based on entered proposals. Bids or offers may be presented to intended parties by web server 208 and communication interface 210, and once displayed, may be accepted or declined.

Figure 3:
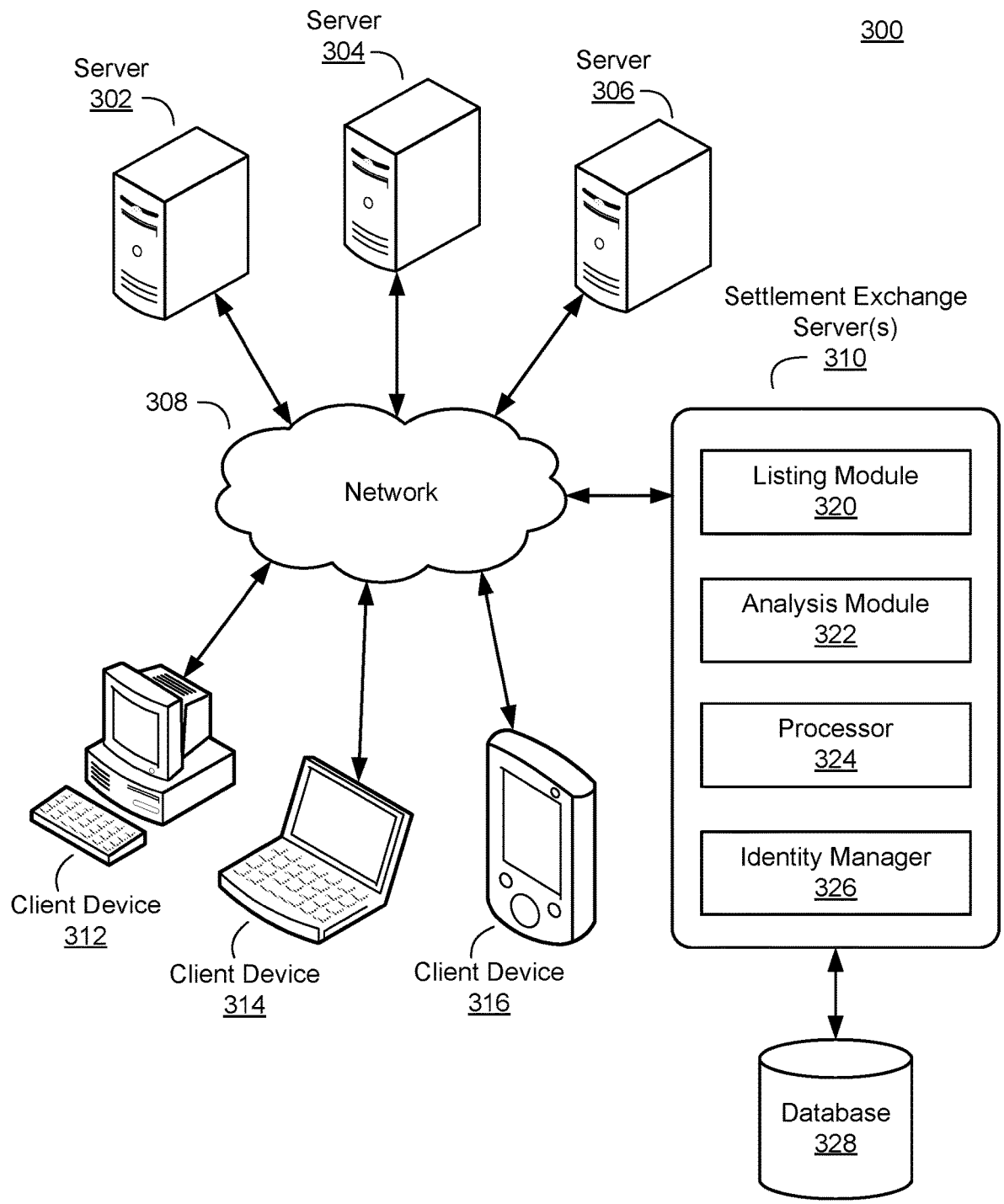
FIG. 3 illustrates a computing system according to another embodiment of the present invention.

FIG. 3 illustrates a computing system according to another embodiment of the present invention. A computing system 300 may include settlement exchange server(s) 310 in communication with servers 302, 304, 306 and client devices 312, 314, 316 through network 308. The settlement exchange server(s) 310 may enable the servers 302, 304, 306 and client devices 312, 314, 316 to interact with each other and enact transactions through an exchange of bids and offers. Listing module 320 may make listings available by allowing to the servers 302, 304, 306 and client devices 312, 314, 316 to post or respond to bids and offers. Bids and offers may be processed and stored to database 328 by processor 324. The listing module 320 may retrieve the bids and offers from database 328 to generate listings for browsing and selection. For example, any one of client devices 312, 314, 316 may browse an interface including listing offers from sellers of issued policies and identify one or more offers to bid on. The settlement exchange server(s) 310 may then transmit bids on offers via the network 308 to parties who submitted the offers and update database 328. A party receiving a bid may be presented with the bid via message communication or on a listing interface.

Identity manager 326 may provide identity services that control the dissemination and access of identifying information of parties. In certain embodiments, bids and offers may include identifying information of insureds of policies, bidding and offering parties, or counterparties acting as brokers. A party participating on settlement exchange server(s) 310 may desire not to have such identifying information for bids and offers displayed. This may be because the circumstances of selling an issued policy may be a private matter that is desired to be kept confidential by the insureds, or that parties may be concerned that they will not receive a fair price. In such instances, identity manager 326 may be configured to block identifying information from being displayed at least until a certain transaction or agreement has occurred. For example, before accepting an offer, identity manager 326 may provide procedures in place to protect the confidentiality of insureds which may be dependent on state regulations governing the handling of confidential information. Identity manager 326 may prompt a bidding party to identify parties or potential parties associated with the bid and whether the end buyers will have access to personal information of the policy insured. As such, the insureds personal information may be protected from public dissemination.

Accepting a bid to an offer may result in an agreement and sales/purchasing/exchange transaction that may be facilitated by processor 324. For example, processor 324 may generate forms or contracts and notify relevant parties of a sale of one or more issued policies agreed upon. Agreements and transactions may be recorded by processor 324 as a transactional history, which may be analyzed and/or aggregated for various purposes by analysis module 322. Analysis module 322 may evaluate and compare policies to determine or calculate certain benchmarks. The evaluation and comparison may include statistical and historical comparison, inputting of variables into a model simulation, predictive analysis, etc. Analytics data is generated by the analysis module 322 and may be presented in a dynamic, multi-dimensional format which allows for the speedy presentation of information.

The disclosed computer systems and computerized methods may be used to facilitate transactions, such as policy owners selling their existing life insurance policies on a secondary market. Selling life insurance policies on a secondary market are further described in commonly owned U.S. Pat. No. 8,108,308, entitled "LIFE SETTLEMENT TRANSACTION SYSTEM AND METHOD INVOLVING APPORTIONED DEATH BENEFIT" which is herein incorporated by reference in its entirety. The present application discloses improved systems and methods that provide a variety of features in a settlement exchange system to facilitate a secondary market for policies. Policies may include agreements, contracts, options, terms, or conditions that provide protection, insurance, or hedging, for example. The systems and methods may provide settlement exchange servers which present policy information to parties on a display screen and enable those parties to respond to the policy information. According to one embodiment, a database containing information relating to parties in the exchange system may indicate which participants are buyers or sellers, and what, if any, limitations are placed on the activity of the participants. In another embodiment, anonymous trading features may prevent third-parties from knowing the identity associated with an offer and may permit configuration of anonymous identity parameters.

The disclosed systems and methods may also evaluate the fair value of, for example, an existing life insurance policy where the consideration is a future contingent payment payable upon the death of the insured under the life insurance policy asset. An appetite may be determined of investors for the life insurance policy asset and their ability to accept a risk and return profile which may differ from the purchase of life insurance policy in which the consideration is paid in cash at the closing of the transaction. The characteristics and risk profile (including expected return and volatility) of each potential transaction may be determined using database parameters. The fit of these results may then be filtered through an eligibility criteria and risk profile of each potential investor to determine an expected return on investment to be generated based on cashflows and a sponsor's expected profit to be generated by each transaction. The filtering may then provide boundaries for potential combination of cash and death benefit that can be offered to a seller of a life insurance policy.

Figure 4:
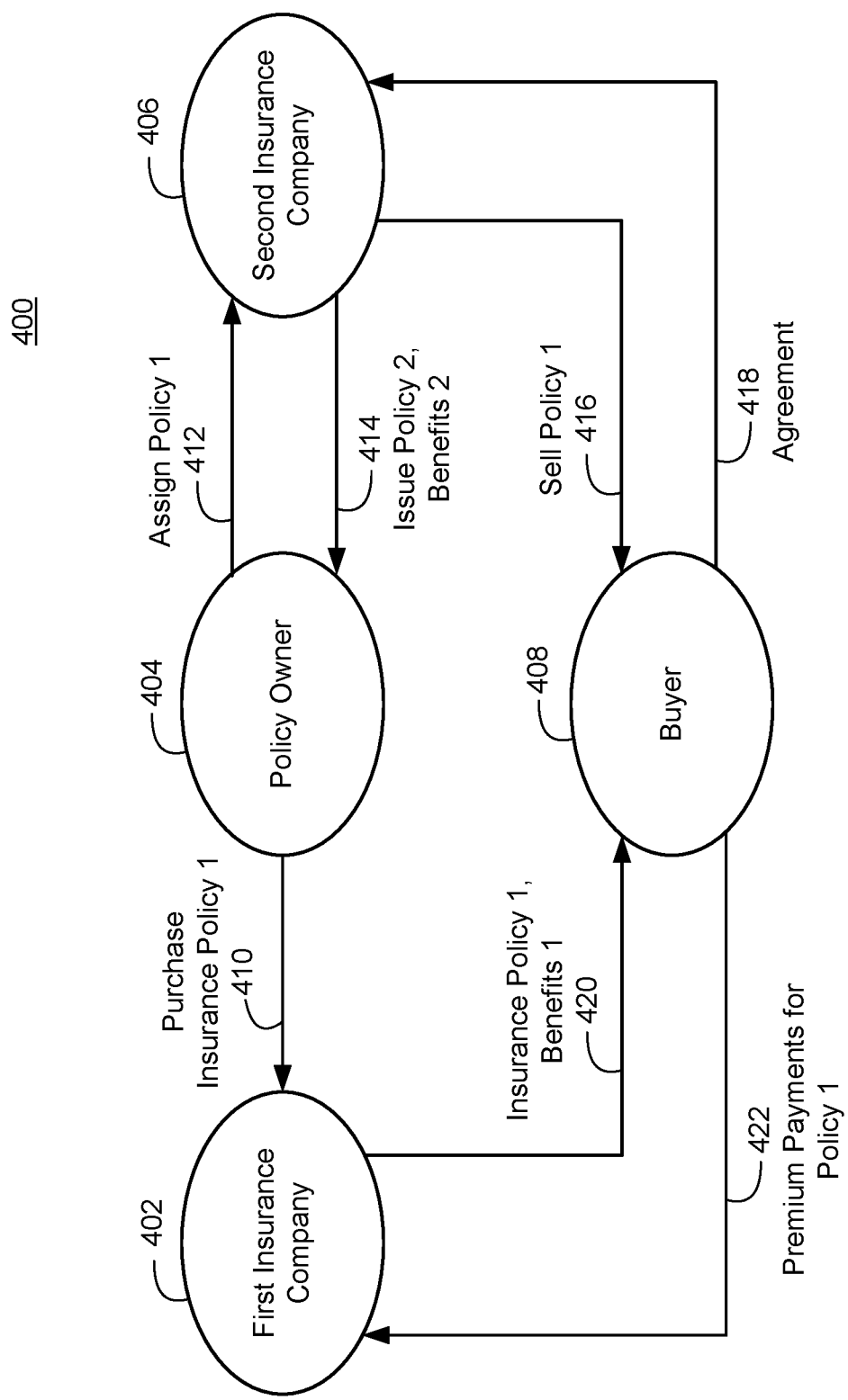
FIG. 4 illustrates a flowchart of a life settlement transaction according to an embodiment of the present invention.

FIG. 4 presents a flowchart of a life settlement transaction according to one embodiment of the present invention. A transaction 400 may include a policy owner 404 that may first purchase a life insurance ("Policy 1") from a first insurance company 402 on the life of an individual at step 410. The Policy 1 may include a designated beneficiary of the owner's choosing and a certain face value, for example $1,000,000, to be received by the policy's beneficiary as a death benefit ("Benefits 1") upon the death of the individual insured under the policy. The beneficiary may be the policy owner 404 or the individual whose life is insured by the policy, or another person designated by the policy owner 404. The person whose life is insured ("Insured 1") may be the policy owner 404 or another person for whom the policy owner 404 has an insurable interest.

Subsequently, in step 412, the policy owner 404 reaches an agreement with a second insurance company 406, and the policy owner 404 assigns Policy 1 to the second insurance company 406. In exchange for this assignment, the second insurance company 406 at step 414 may issue a second life insurance policy ("Policy 2") with a death benefit ("Benefits 2") to the policy owner 404. The second insurance company 406 may include a server that can calculate appropriate levels of insurance to purchase in exchange for Policy 1 and the actuarial factors relevant to both Policy 1 and Policy 2. For example, Policy 2 may comprise a $300,000 paid-up certificate of insurance under a group master policy. No premiums may need to be paid by policy owner 404 to keep the certificate in force. Insured 1 is the insured under the certificate of insurance, and the policy owner 404 can choose the beneficiary. Alternatively, Policy 2 may comprise an individual paid-up life insurance policy to policy owner 404. The market value of Policy 1 may serve as the initial premium payment under the Policy 2 insurance coverage.

The second insurance company 406 may then sell Policy 1 to a Buyer 408, at step 416, in exchange for an agreement 418 by the Buyer 408 to (i) pay the premiums required to keep the Policy 1 in force (422), (ii) pay certain fees to the second insurance company 406, and (iii) pay or cause to be paid an amount of Benefits 2 (e.g., $300,000) to the second insurance company 406 when Insured 1 dies. When Insured 1 dies, (a) the first insurance company 402 will pay the Benefits 1 to Buyer 408, the owner of Policy 1, (b) Buyer 408 will pay the amount of Benefits 2 to the second insurance company 406, and (c) the second insurance company 406 will pay the amount of Benefits 2 to the beneficiary under Policy 2. As an alternative to steps (a) and (b) above, the first insurance company 402 could pay $700,000 (i.e., the difference between the amount of Benefits 1 and Benefits 2) to Buyer 408 and $300,000 (i.e., the amount of Benefits 2) directly to the second insurance company 406.

According to another embodiment, to the extent that policy owner 404 wants to receive cash compensation at closing in addition to a paid-up life insurance policy/certificate, the second insurance company 406 can accommodate that by (i) structuring Policy 2 to have some cash value, (ii) making a cash payment to policy owner 404, or (iii) providing policy owner 404 with an annuity. For example, instead of providing policy owner 404 with a $300,000 paid-up certificate of insurance, the second insurance company 406 could give policy owner 404 (i) a $200,000 paid-up certificate and (ii) $40,000 of cash or cash equivalent. The cash may be funded by the sale of the Policy 1 in step 416 where the second insurance company 406 sells Policy 1 to buyer 408 in exchange for an agreement by the buyer 408 to (i) pay the premiums required to keep Policy 1 in force, (ii) pay certain fees to the second insurance company 406, (iii) pay $40,000 to the second insurance company 406 at the time of closing, and (iv) pay or cause to be paid $250,000 to the second insurance company 406 when Insured 1 dies.

Figure 5:
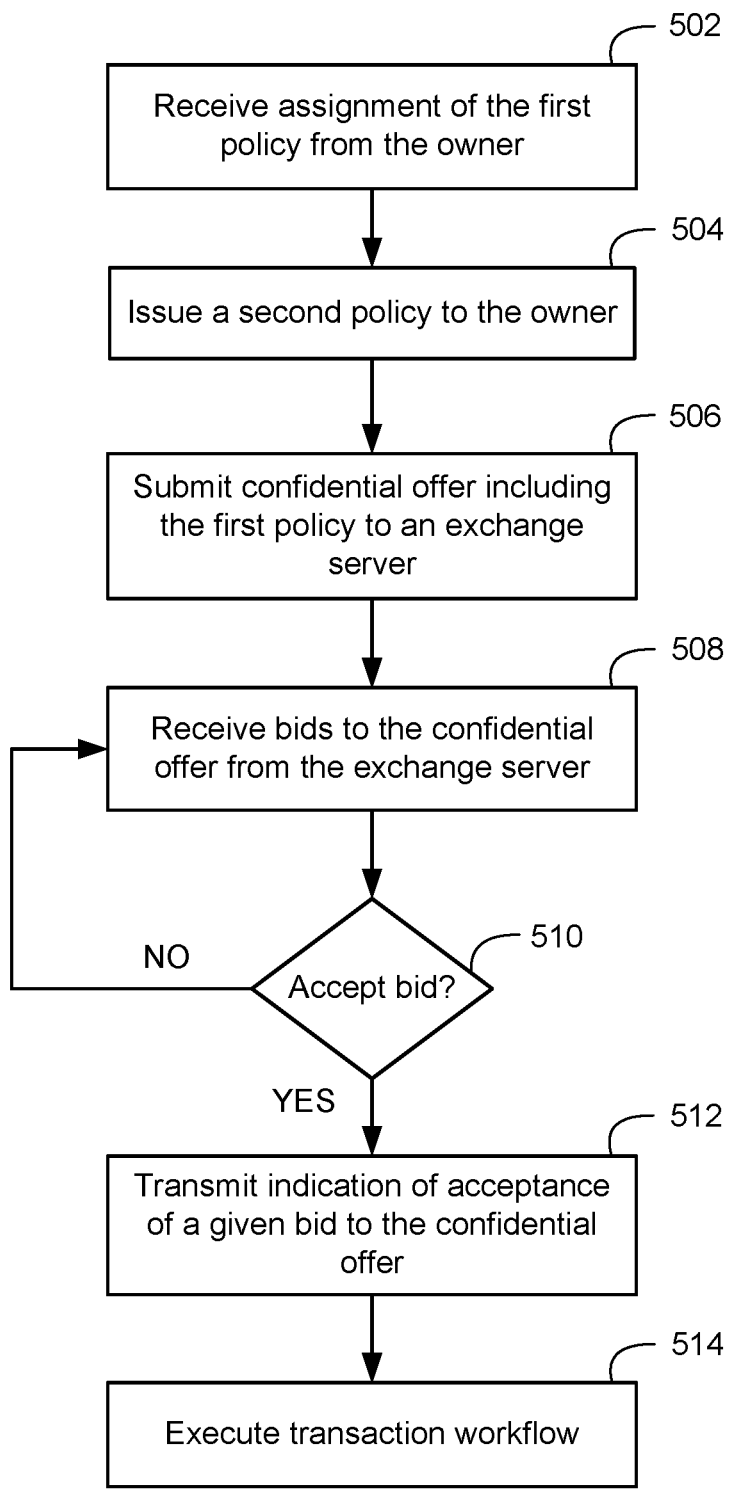
FIG. 5 illustrates a flowchart of a method for conducting a privatized transaction on an electronic exchange according to an embodiment of the present invention.

FIG. 5 presents a flowchart of a method for conducting a privatized transaction on an electronic exchange according to an embodiment of the present invention. Assignment of a first policy is received by a server from an original owner of the first policy, step 502. The first policy may be an insurance policy including a given value on a life of an insured that is issued to the original owner (which may or may not be the insured) by a first insurance company. A transaction may be executed by the original owner of the first policy that causes the assignment, such as a transfer of the first policy to a second insurance company, reinsurer, or any other entity for a given sum of money. The first policy may be designated by the assignment to an assignee or receiving party that may be the second insurance company, reinsurer, etc. The assignment may be received electronically by a recording system of the server via data entry and/or file attachments a computing device associated with the original owner.

At least one second policy is issued by the server to the original owner, step 504. The second policy may include a paid-up certificate of insurance under a group master policy or an individual paid-up life insurance policy with a value selected or determined by the server that is a portion of the value of the first policy. Issuance of the second policy may supplement the transaction. The insured under the first policy may be the insured under the second policy and the original owner may choose a beneficiary. Additionally, the original owner may not be required to pay premiums to keep the second policy in force. In effect, the intrinsic value of the first policy from the transaction may serve as the initial premium payment under the second policy.

The server submits a confidential offer including the first policy to an exchange server via an application interface, step 506. The server may be registered with the exchange server as a party authorized to post offers as well as bids to an electronic exchange or marketplace. Submitting the confidential offer may include an entry of data including an offer price for the first policy, details regarding the first policy, parameters of confidentiality, a recipient of the offer (if specified), and any other information associated with the offer to a transaction processor by the exchange server. The transaction processor may record the confidential offer and perform market exchange functions that disseminate the offer and process any bids to the offer that may be received from other parties that are then relayed to the offering party by the transaction processor.

The exchanger server may control the electronic access of identifying information of parties during an offer and bid process based on the parameters of confidentiality. The parameters of confidentiality may include a specification or limitation of what information is kept private and criteria or conditions for allowing disclosure of the private information to an offer or bid. Prior to submitting a bid to the offer, a potential bidding party may perform certain actions to satisfy the conditions under the parameters of confidentiality to be allowed to disclose private information associated with the offer and/or bid. For example, certain identifying information may be electronically blocked from being displayed at least until an agreement, such as a confidentially agreement, has been executed or submitted by the potential bidding party.

The server receives bids to the confidential offer from the exchange server, step 508. The exchange server may relay to the server one or more bids that are responsive to the offer. The server may receive the bids as electronic messages, such as text messages and email, or via an application interface message from the exchange server. One or more client devices may access or connect with the server to review the bids.

The server determines whether a bid has been accepted for the confidential offer, step 510. The server may continue to receive bids to the confidential offer at step 508 until a bid has been accepted. A signal may be received by the server that is representative of an acceptance of a given bid to the offer from the one or more client devices. If the acceptance signal is received by the server, an indication of acceptance of a given bid to the confidential offer is transmitted to the exchange server, step 512.

A transaction workflow is executed, step 514. A sales agreement may be entered with a buyer associated with the accepted bid in exchange for the first policy in response to the indication of acceptance. The exchange server may facilitate the sales agreement by generating a transaction workflow. The transaction workflow may include generating forms or contracts and contacting relevant parties of a sale. The sales agreement may comprise the offering party associated with the server agreeing to sell the first policy to the buyer in exchange for an agreement by the buyer to pay to the first insurance company the premiums required to keep the first policy in force, pay certain fees to the offering party and pay at least the value of the second policy to the offering party upon the occurrence of an event, such as when the insured of the policy dies. The issuer of the first policy may pay the value of the first policy to the buyer, the buyer pays or causes to be paid at least the value of the second policy to the offering party, and the offering party may then pay the value of the second policy to the beneficiary of the second policy.

Figure 6:
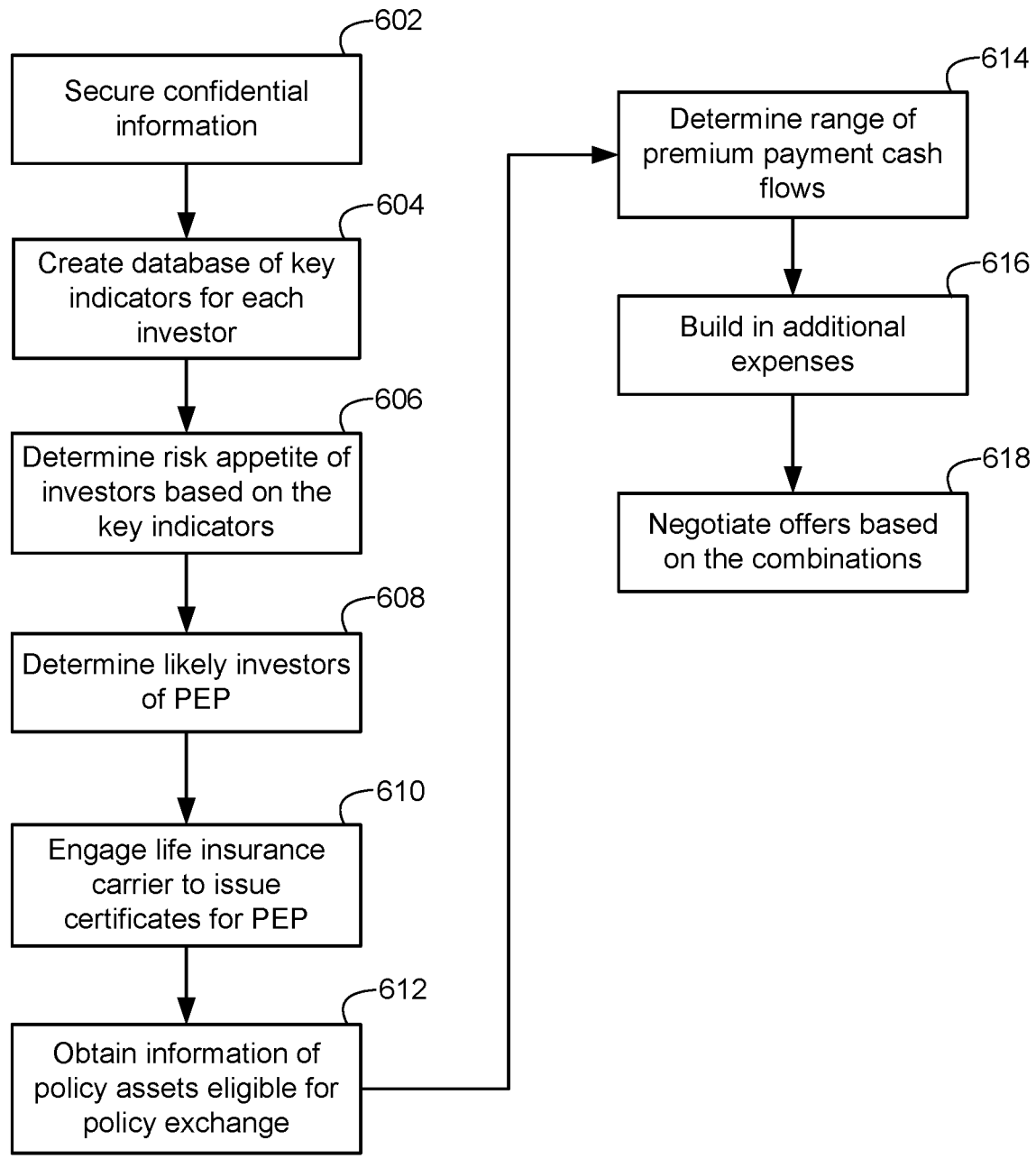
FIG. 6 illustrates a flowchart of a method for performing policy exchange analysis according to an embodiment of the present invention.

FIG. 6 presents a flowchart of a method for performing policy exchange analysis by a server and/or an analysis module according to an embodiment of the present invention. The server may secure confidential information regarding potential investors, step 602. Potential investors may participate in purchasing assets generated by a policy exchange program ("PEP") by providing confidential information to the server including income, amount of capital to invest, eligibility criteria and specifics on recently acquired life insurance policy assets.

Relationships may be developed with investors to garner interest. Non-disclosure agreements may be signed with interested investors. Additionally, documents detailing an investor's directives may be obtained and used to determine the investor's eligibility criteria and capacity. The server may also identify assets sold to investors. A database of life insurance policy assets sold to investors may be reviewed. Data points and cash flows for each asset owned by the investors may be identified. An investor's expected return and risk appetite may be determined based on a combination of the confidential information.

Figure 7:
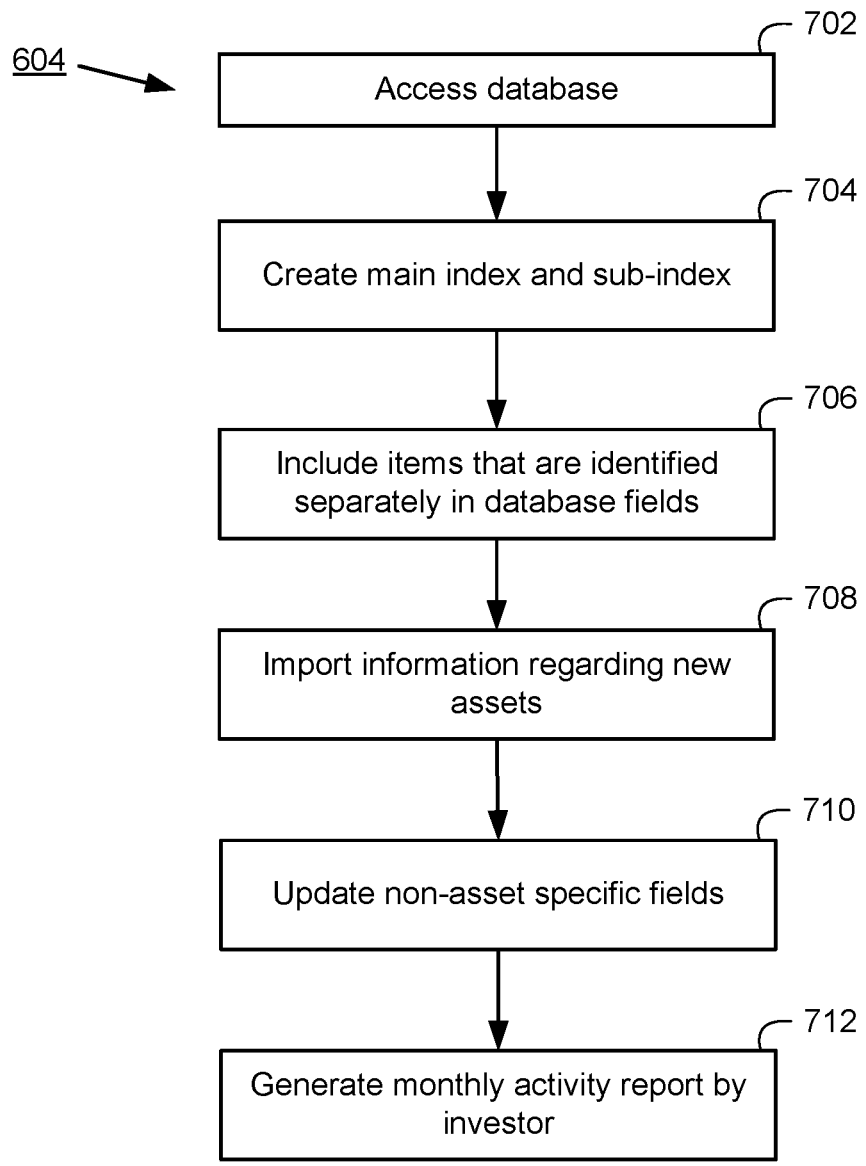
FIG. 7 presents a flowchart of a method for creating a database of key indicators for each investor according to an embodiment of the present invention.

A database of key indicators for each investor is created by the server based on the confidential information, step 604, as described further with reference to FIG. 7. Based on the key indicators, a risk appetite may be determined for each investor, step 606. Formulas, as disclosed herewith, may be applied to calculate the risk appetite of each investor. Additional details of determining risk appetite of each investor is described further with reference to FIG. 8. Based on the formulas, the server may determine which of the potential investors would be likely to purchase assets generated by the PEP, step 608, as described further with reference to FIG. 9. A life insurance carrier is engaged to issue certificates for the PEP, step 610, as described further with reference to FIG. 10.

Figure 11:
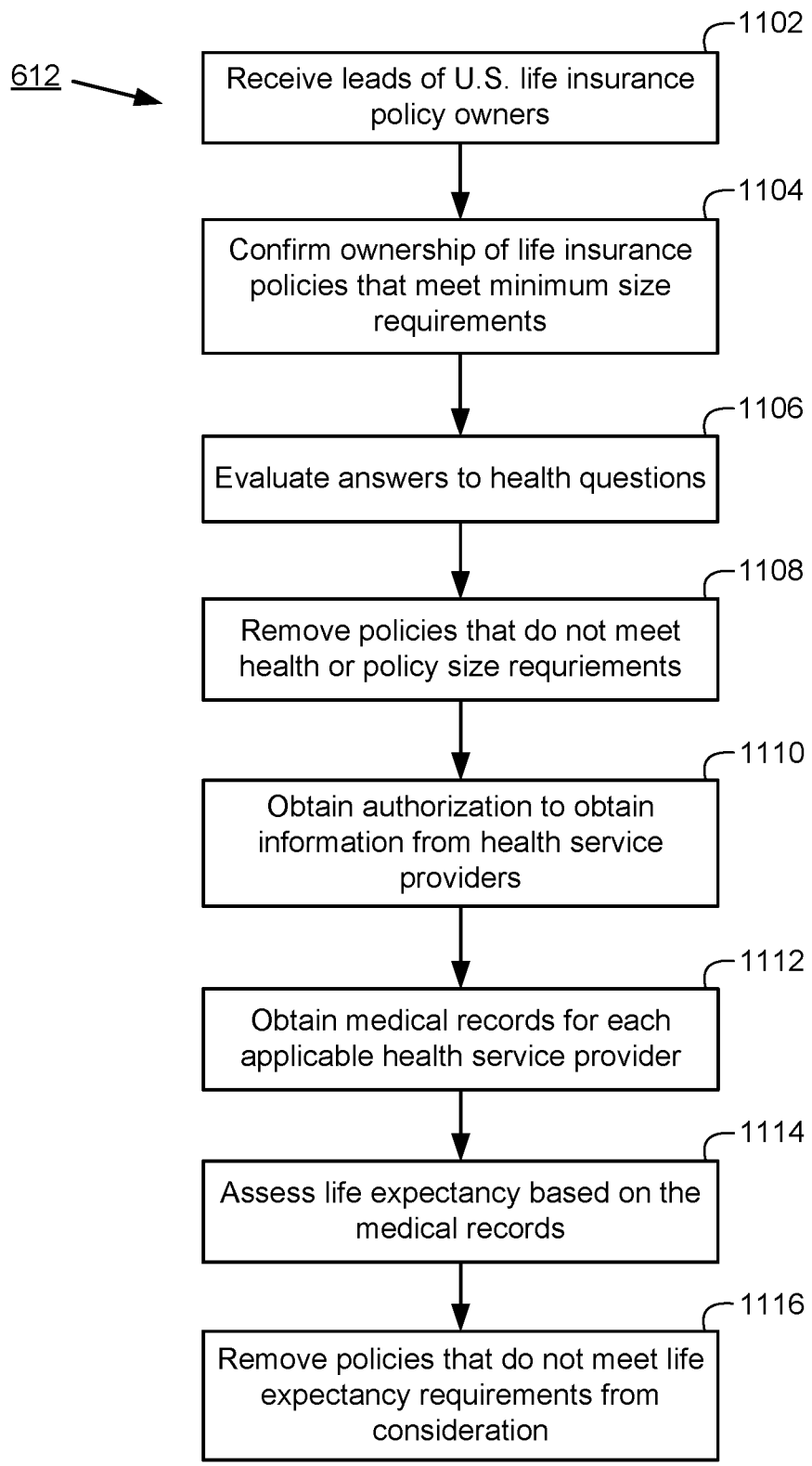
FIG. 11 presents a flowchart of a method for obtaining information of policy assets eligible for policy exchange according to an embodiment of the present invention.

Insured information related to life insurance policy assets that are eligible to participate in the PEP is obtained, step 612, as described further with reference to FIG. 11. The specific information may include the following data points:
Life Insurance Policy Asset ID Number;
m Duration at which life insurance policy expires (measured from asset acquisition date);
s Sex of insured;
x Age of insured at policy issue date.

A range of premium payment cash flows is determined by retrieving life insurance company premium illustrations, step 614. The server generates a cashflow projection model that matches various expected cash flows to be generated by the life insurance policy assets given its various expense and interest crediting components. The generated cashflow projection model may utilize variables and formulas that are disclosed in further detail herewith. The generated projection model may be used to determine cash flows required to support life insurance policy assets under various scenarios using formulas such as those set forth above. Determining a range of premium payment cash flows is described further with reference to FIG. 13.

Additional expenses other than asset specific cash flows needed to complete a transaction under the PEP are built in, step 616. Alternative offers are negotiated based on the various combinations, step 618. The alternative offers may be used in negotiating purchasing of eligible life insurance policy assets through the PEP.

FIG. 7 presents a flowchart of a method for creating a database of key indicators for each investor according to an embodiment of the present invention. This method is performed during step 604 as set forth in FIG. 6. The information gathered from step 602 is used to maintain a database of key information and indicators for each investor. A database is accessed or created for the key indicators, step 702. The database may be set up in structured query language ("SQL") or any other programming language compatible with databases, step 702. A main index is created based on investor and a sub-index is created based on investment vehicle, step 704.

Database fields in the database are included with items that are identified separately, step 706. Exemplary database fields may include non-asset specific fields (e.g., name of investor, contact information for each key employee of investor, name, address/location, one or more contact phone numbers, one or more contact email addresses, investment vehicles, name of vehicle, jurisdiction, investment manager, investment blend, investment strategy, investment directives, size, available capital to invest, location of source of funds (sub-investors), or risk appetite data) and asset specific fields (e.g., asset ID, purchase price, expected cash flows by duration, insured(s), name, age, sex, address, contact information, last time contacted, life expectancies (may be multiple), primary life expectancy (used to acquire asset), or maturity indicator). Information regarding new assets is imported from ongoing review of data, step 708. Non-asset specific fields are updated from ongoing review of data, step 710. Ongoing review of data may comprise populating the database fields with information received from data import and/or entry from computing devices over a communications network. A monthly activity report by investor is generated, step 712

Figure 8:
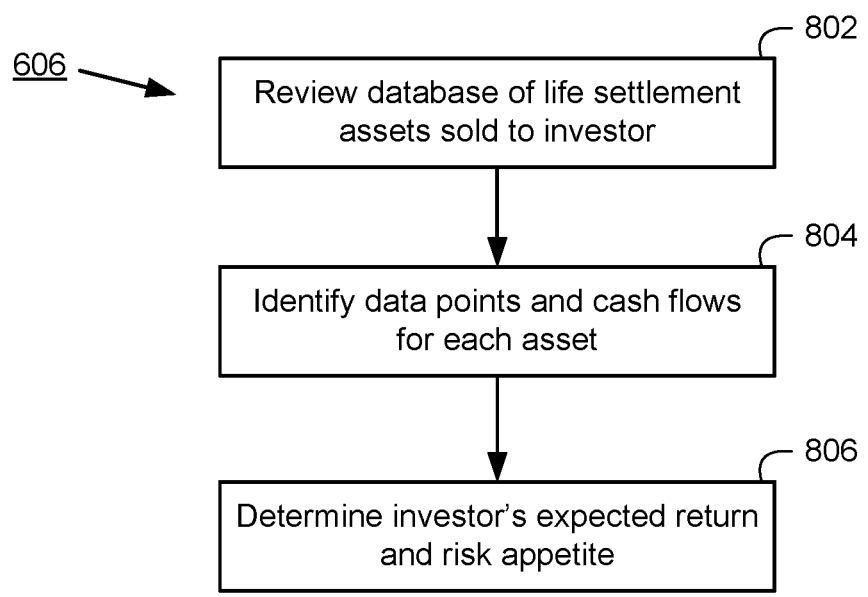
FIG. 8 presents a flowchart of a method for determining risk appetite of investors according to an embodiment of the present invention.

FIG. 8 presents a flowchart of a method for determining risk appetite of investors according to an embodiment of the present invention. This method is performed during step 606 as set forth in FIG. 6. Formulas may be applied to the key indicators from step 604 to determine the risk appetite of each investor. Asset specific data for each investor may be obtained. The database of life insurance assets sold to the investor is reviewed, step 802. Data points and cash flows for each asset are identified, step 804.

An investor's expected return and risk appetite are determined, step 806. Determining the investor's expected return and risk appetite may include performing calculations, as disclosed in the following, periodically (and repeatedly) for each investor and for all assets purchased by such investor. Data points for performing the calculations may include:

\# Asset ID Number;

I Investor;

m Duration at which life insurance policy expires (measured from asset acquisition date);

n Scenario;

s Sex of insured;

t Duration (measured from asset acquisition date);

x Age of insured at policy issue date;

z Number of scenarios;

LE Life expectancy estimate;

MT Mortality Table used by investor to determine mortality curve;

$q_{x:t}$ Mortality rate for insured's sex, age of insured at policy issue date, duration since date in which the LE is determined based on mortality table MT;

\# $NDB_t$ Net Death Benefit payable if death occurs in duration 't' for asset \#;

\# $CF_t$ Cash Flow for duration 't' measured from date of asset acquisition (as used by the investor in the valuation of the asset); and $PP_\#$ Purchase price paid for asset '\#'.

Variables for performing the calculations may include:

$p_{x:t}$ Survival rate for insured's sex, age of insured at policy issue date, duration since date in which the LE is determined based on mortality table MT;

tPx Probability of survival to end of duration 't';

$MR_\#$ Mortality rating that causes the mortality curve to generate a life expectancy equal to LE;

$MR_s$ Mortality rating that causes the mortality curve to generate a life expectancy equal to $LE_s$ under a given scenario;

$NPV_n$ Net present value of generated under scenario 'n';

$_\#\mu_{NPV}$ Average NPV;

$_\#\sigma_{NPV}$ Standard Deviation of NPV; and $_I\sigma_{NPV-Max}$ Maximum observed standard deviation of NPV for investor "I".

Formulas used in the calculations may include:

$$p_{[x]+t}^s = 1 - MR_s * q_{[x]+t}$$

For each 't', $$tP^sx = \prod_{t=0}^{m} p_{x+t}$$

$$NPV_\# = \sum_{t=0}^{m} {}_\#NDB_t * tP^\#x * MR_\# * q_{[x]+t} - \sum_{t=0}^{m} tP^\#x *_\# CF_t$$

$$NPV_n = \sum_{t=0}^{m} {}_nNDB_t * tP^nx * MR_n * q_{[x]+t} - \sum_{t=0}^{m} tP^nx *_\# CF_t$$

$$_\#\mu_{NPV} = \frac{1}{z} * \sum NPV_s$$

$$_\#\sigma_{NPV} = \sqrt{\frac{\sum[NPV_s - {}_\#\mu_{NPV}]^2}{z}}$$

$$_I\sigma_{NPV-Max} = \text{Max}[_\#\sigma_{NPV}]$$

Figure 9:
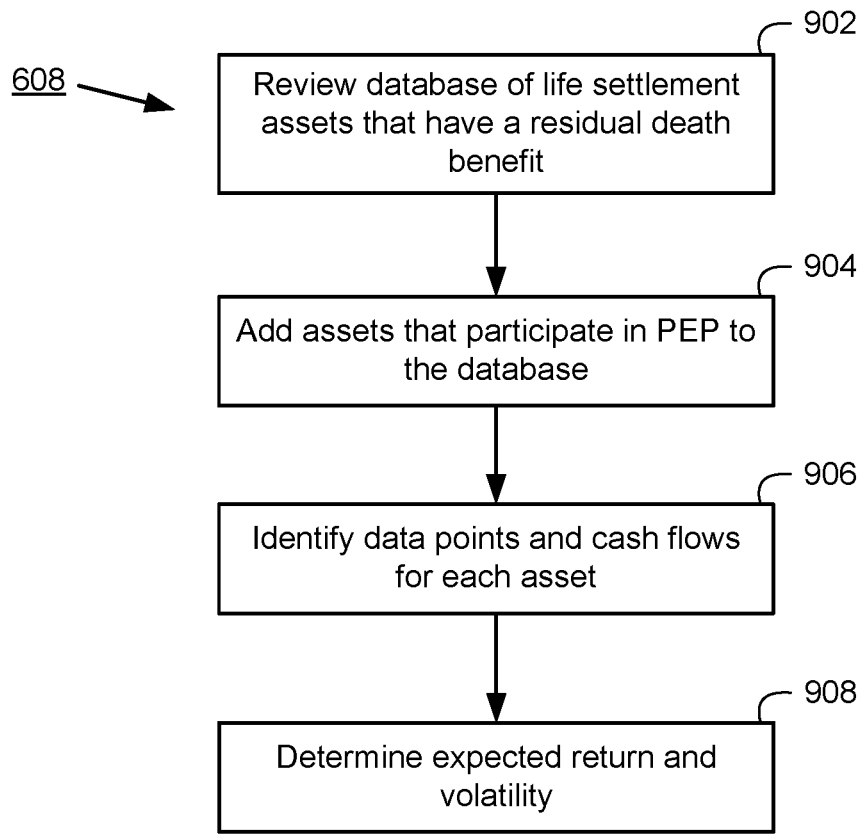
FIG. 9 presents a flowchart of a method for determining likely investors of a policy exchange program according to an embodiment of the present invention.

FIG. 9 presents a flowchart of a method for determining likely investors of a policy exchange program according to an embodiment of the present invention. This method is performed during step 608 as set forth in FIG. 6. Based on the results from step 606, the disclosed computing system determines which investors would be likely to purchase assets generated by the PEP. Existing cases may be reviewed where residual death benefits were put in place from the company's general portfolio of originated assets and evaluate scenarios for each asset to determine expected volatility for the assets originated from PEP. These results may be compared with investors' eligibility criteria and risk appetite to determine which investors could purchase the assets originated through PEP.

Asset specific data for residual death benefit cases may be obtained. A database of life insurance assets that have a residual death benefit is reviewed, step 902. Assets that participate in PEP are added to the database, step 904. Data points and cash flows for each asset are identified, step 906.

Expected return and volatility are determined for residual death benefit, death benefit, and PEP assets, step 908. The following calculations may be performed and repeated periodically for each asset. Data points for determining the expected return and volatility may include:

\# Asset ID Number;

m Duration at which life insurance policy expires (measured from asset acquisition date);

n Scenario;

s Sex of insured;

t Duration (measured from asset acquisition date);

x Age of insured at policy issue date;

z Number of scenarios;

LE Life expectancy estimate;

MT Mortality Table used to determine mortality curve;

$q_{x:t}$ Mortality rate for insured's sex, age of insured at policy issue date, duration since date in which the LE is determined based on mortality table MT;

$_\#NDB_t$ Net Death Benefit payable if death occurs in duration 't' for asset \#;

$_\#CF_t$ Cash Flow for duration 't' measured from date of asset acquisition (as used by the investor in the valuation of the asset); and $PP_\#$ Purchase price paid for asset '\#'.

Variables for determining the expected return and volatility may include:

$p_{x:t}$ Survival rate for insured's sex, age of insured at policy issue date, duration since date in which the LE is determined based on mortality table MT;

tPx Probability of survival to end of duration 't';

$MR_\#$ Mortality rating that causes the mortality curve to generate a life expectancy equal to LE;

$MR_s$ Mortality rating that causes the mortality curve to generate a life expectancy equal to $LE_s$ under a given scenario;

$_{\#}\mu_{NPV}$ Net present value of generated under scenario 'n';

$_{\#}\sigma_{NPV}$ Average NPV;

$_{\#}\sigma_{NPV}$ Standard Deviation of NPV; and $\mu_{NPV\text{-}\sigma}$ Maximum observed standard deviation of NPV.

Formulas used in the determination of the expected return and volatility may include:

$$p_{[x]+t}{}^s = 1 - MR_s * q_{[x]+t}$$

For each 't', $$tP^s x = \prod_{t=0}^{m} p_{x+t}$$

$$NPV_\# = \sum_{t=0}^{m} {}_\#NDB_t * tP^\# x * MR_\# * q_{[x]+t} - \sum_{t=0}^{m} tP^\# x *{}_\#CF_t$$

$$NPV_s = \sum_{t=0}^{m} {}_\#NDB_t * tP^s x * MR_s * q_{[x]+t} - \sum_{t=0}^{m} tP^s x *{}_\#CF_t$$

$$_{\#}\mu_{NPV} = \frac{1}{z} * \sum NPV_s$$

$$_{\#}\sigma_{NPV} = \sqrt{\frac{\sum [NPV_s - {}_\#\mu_{NPV}]^2}{z}}$$

$$\mu_{NPV\text{-}\sigma} = \text{Average}[{}_\#\sigma_{NPV}]$$

Potential investors for PEP may be those whose eligibility criteria fits the requirements for PEP's assets and whose appetite for cash flow volatility equals or exceeds the average standard deviation of an asset that has a Residual Death Benefit or that participates in PEP:

$$_{I}\sigma_{NPB\text{-}Max} \geq \mu_{NPV\text{-}\sigma}$$

Figure 10:
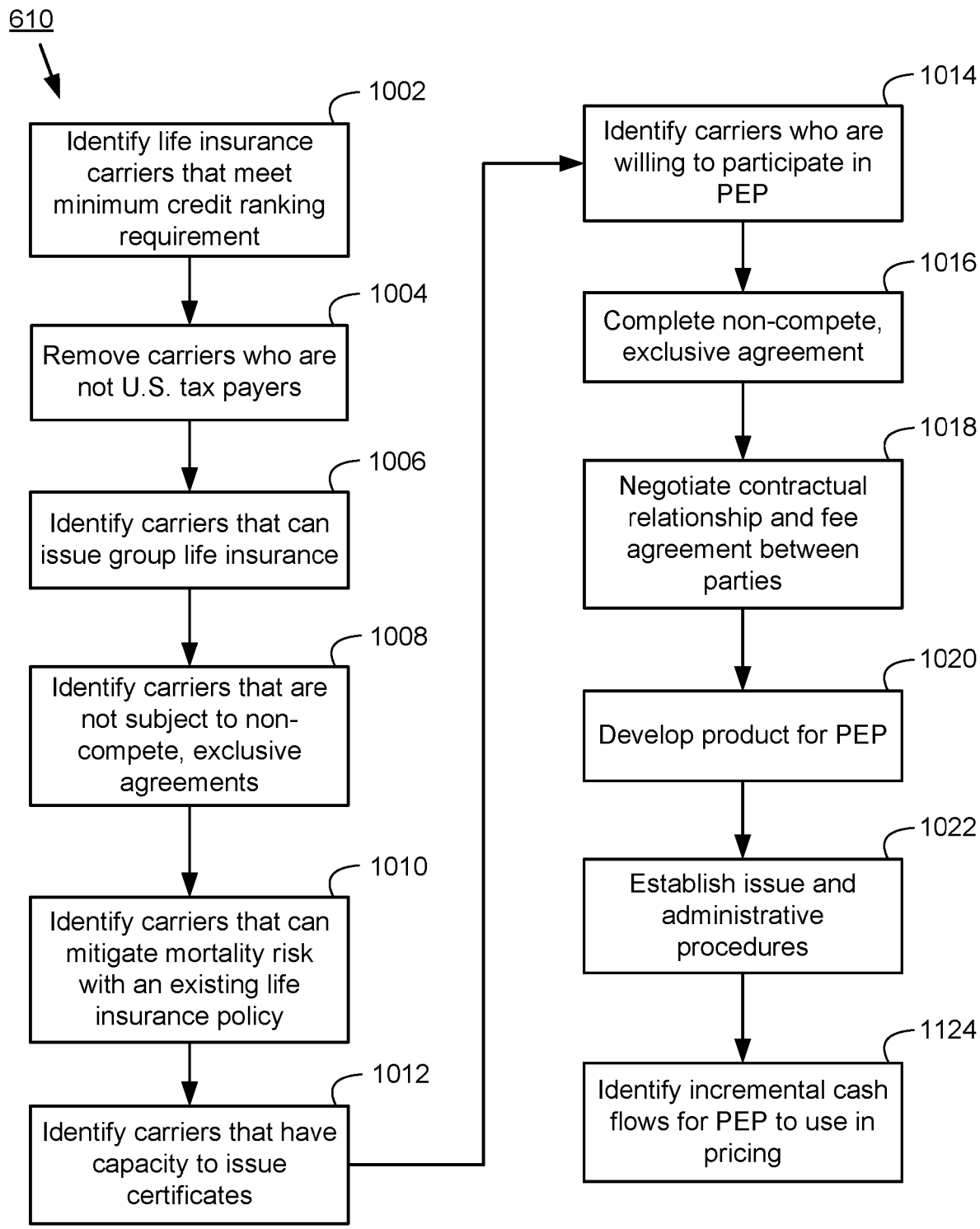
FIG. 10 presents a flowchart of a method for engaging life insurance carrier to issue certificates for a policy exchange program according to an embodiment of the present invention.

FIG. 10 presents a flowchart of a method for engaging life insurance carrier to issue certificates for a policy exchange program according to an embodiment of the present invention. This method is performed during step 610 as set forth in FIG. 6. Life insurance carriers that meet a minimum credit ranking requirement are identified, step 1002. Carriers who are not U.S. tax payers are removed, step 1004. Carriers that can issue group life insurance are identified, step 1006. Carriers that are not subject to non-compete, exclusive agreements are identified, step 1008. Carriers that can mitigate mortality risk with an existing life insurance policy are identified, step 1010. Carriers that have capacity to issue certificates as needed by PEP are identified, step 1012. Carriers who are willing to participate in PEP are identified, step 1014.

A non-compete or exclusive agreement is signed and completed, step 1016. Contractual relationship and fee agreement between parties are negotiated, step 1018. A product for PEP is developed, step 1020. Issue and administrative procedures are established, step 1022. Incremental cash flows for PEP to use in pricing are identified, step 1024

FIG. 11 presents a flowchart of a method for obtaining information of policy assets eligible for policy exchange according to an embodiment of the present invention. This method is performed during step 612 as set forth in FIG. 6. Leads of U.S. life insurance policy owners are received, step 1102. Ownership of life insurance policies that meet minimum size requirements is confirmed, step 1104. Answers to health questions are evaluated to determine potential qualification, step 1106. Policies that do not meet the health or policy size requirements are removed, step 1108.

Authorization is obtained to obtain information from health service providers related to the policies, step 1110. Medical records for each applicable health service provider are obtained, step 1112. Life expectancy reports are generated based on the medical records and are assessed, step 1114. Policies that do not meet life expectancy requirements are removed from consideration, step 1116

Figure 12:
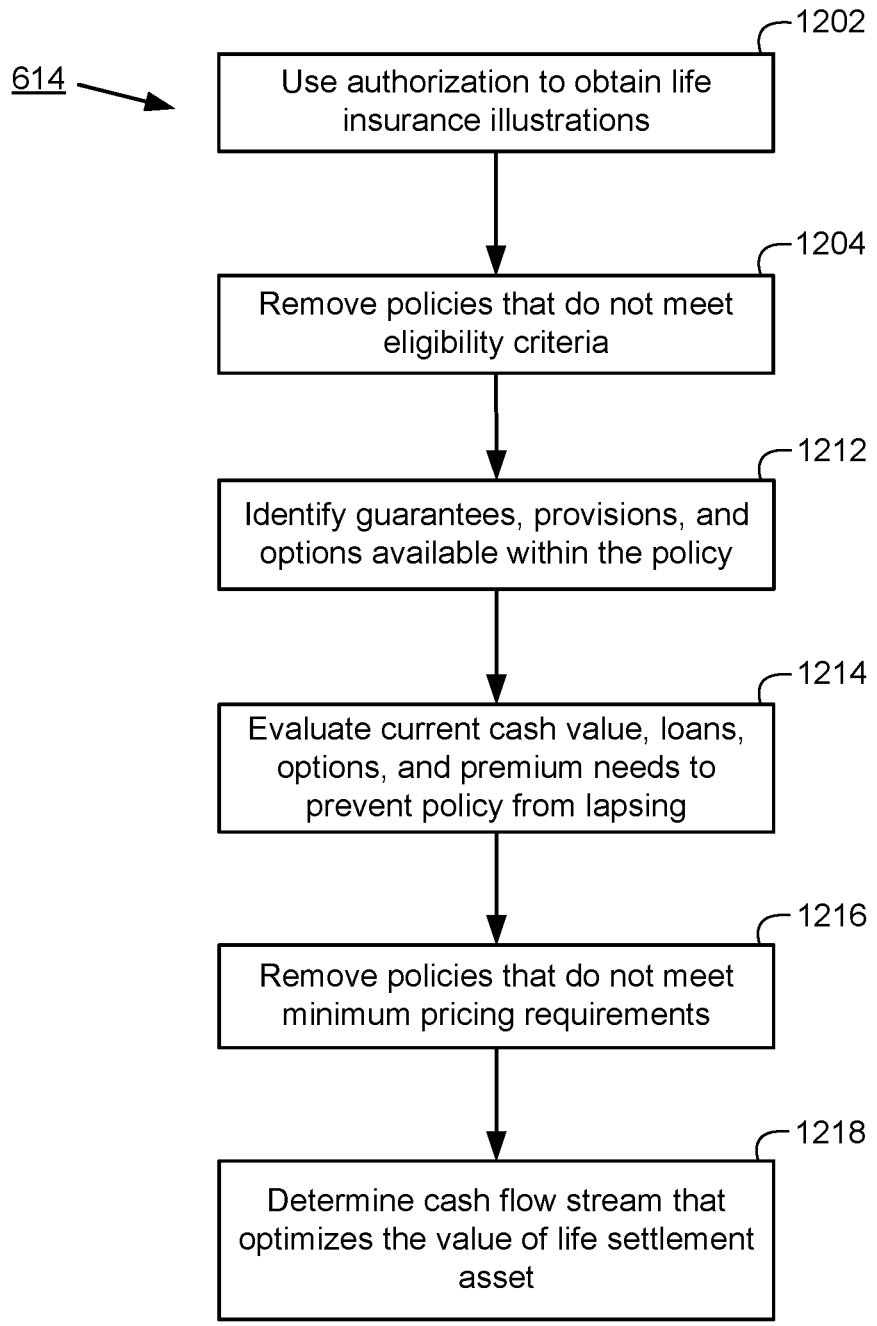
FIG. 12 presents a flowchart of a method for determining a range of premium payment cash flows according to an embodiment of the present invention.

FIG. 12 presents a flowchart of a method for determining a range of premium payment cash flows according to an embodiment of the present invention. This method is performed during step 614 as set forth in FIG. 6. Life insurance company premium illustrations may be secured to determine the range of premium payment cashflows. Authorization is used to obtain life insurance illustrations for each policy, step 1202. Policies that do not meet certain eligibility criteria are removed, step 1204. The eligibility criteria may include policy type eligibility criteria, minimum size eligibility criteria, maturity date eligibility criteria, and policy duration eligibility criteria.

Non-lapse guarantees, policy shadow account provisions, minimum interest rate guarantees and other options available within the policy are identified, step 1212. Current cash value, loans, options, and potential premium needs to prevent the policy from lapsing are evaluated, step 1214. Policies that do not meet applicable eligibility criteria based on the evaluation may be removed. Policies that do not meet minimum pricing requirements are removed, step 1216. For each policy that remains after 1216, a cash flow stream (premiums, loans and withdrawals) may be determined that may optimize the value of the asset (making sure that the cash flow levels in the period between acquisition and maturity do not cause the contract to lapse), step 1218. A cashflow projection model may be engineered to match various expected cash flows to be generated by a life insurance policy asset given its various expense and interest crediting components. The engineered projection model may be used to determine cash flows required to support the life insurance policy asset under various scenarios.

The following data points may be used in determining the cash flow:

m Duration at which life insurance policy expires (measured from asset acquisition date);

n Scenario;

s Sex of insured;

f In-force duration (measured from issue date to acquisition date);

t Duration (measured from asset acquisition date);

x Age of insured at policy issue date;

z Number of scenarios;

LE Life expectancy estimate;

MT Mortality Table used to determine mortality curve;

$q_{x:t}$ Mortality rate for insured's sex, age of insured at policy issue date, duration since date in which the LE is determined based on mortality table MT;

$DB_0$ Death benefit as of the acquisition date;

$AV_0$ Account value as of the acquisition date; and $CV_0$ Cash surrender value as of the acquisition date.

The following variables may be used in determining the cash flow:

$p_{x:t}$ Survival rate for insured's sex, age of insured at policy issue date, duration since date in which the LE is determined based on mortality table MT;

tPx Probability of survival to end of duration 't';

$MR_s$ Mortality rating that causes the mortality curve to generate a life expectancy equal to $LE_s$ under a given scenario;

$L_t$ Loan balance at end of period T;

$L_0$ Loan balance outstanding as of the acquisition date;

$LN_t$ Loan amount drawn at end of period 't';

$LR_t$ Loan repayment amount at beginning of period 't';

$i_t^l$ Loan rate for period 't';

$c_t$ Credited interest rate on non-loaned amounts for period 't';

$c_t^l$ Credited interest rate on loaned amounts for period 't';

$DB_t$ Death benefit for duration T;

$NDB_t$ Net Death Benefit payable if death occurs in duration 't';

$PDB_t$ Policy Exchange Program certificate death benefit for duration T;

$P_t$ Premium Payment at beginning of period 't';

$L_t^P$ Premium load (as percentage of premium paid) for duration 't';

$L_t^f$ Policy load (as dollar amount adjusted for period duration) for duration 't';

$COIR_t$ Cost of insurance rate (as percentage of NDB) for duration 't';

$COI_t$ Cost of insurance charge for duration T;

$W_t$ Cash withdrawal during period T;

$AV_t$ Account Value at end of period T;

$SC_t$ Surrender charge (as percentage of cash withdrawal amount) for duration T;

$CF_t$ Cash Flow for duration 't' measured from date of asset acquisition;

$NPV_n$ Net present value of generated under scenario 'n';

PExp PEP program related expenses;

PR&C PEP Reserve and Capital Requirements; and

ChPRC Change from period to period of PR&C.

The following formulas may be used to determine the cash flow: For each 't' in any given scenario, from 1 to 'm'

$$NDB_t = DB_t - CV_t$$

$$COI_t = COIR_t * NDB_{t-1}$$

$$L_t^B = (L_{t-1} + LN_t - LR_t)$$

$$L_t = L_t^B * (1 + i_t^l)$$

$$AV_t = (AV_{t-1} - L_t^B - W_t + (1-L_t^P)*P_t - L_t^F - COI_t)*(1+c) + L_t^B*(1+c_t^l)$$

$$CV_t = AV_t - SC_t$$

$$CF_t = P_t + LN_t - LR_t - W_t$$

Scenarios may include (1) account value cannot be below zero at any time, (2) cash surrender value cannot be below zero at any time, (3) shadow account, (4) minimum premium no-lapse guarantee, etc.

$$p_{[x]+t}^s = 1 - MR_s * q_{[x]+t}$$

$$tP^sx = \prod_{t=0}^{m} p_{x+t}$$

$$NPV_n = \sum_{t=0}^{m}(_nNDB_t - PDB_t + PRC_t)*tP^nx*MR_n*q_{[x]+t} - $$

$$\sum_{t=0}^{m} tP^sx*(_nCF_t + PExp_t + ChPRC)_t$$

Cash flows for the scenario where the cash flows generate the greatest $NPV_n$ may be selected.

FIGS. 1 through 12 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for processing electronic offers, the system comprising:
   at least one processing device; and
   at least one computer readable storage device storing data instructions that, when executed by the at least one processing device, cause the at least one processing device to:
   generate a database of parameters based on first electronic data representing confidential information regarding potential investors including expected return and risk appetite of the potential investors;
   receive second electronic data representing information associated with a first policy, the information associated with the first policy including a first benefit value on a life of an insured, a first entity that issued the first policy, premiums, loans, and withdrawals;
   generate a cashflow projection model that matches various expected cash flows to be generated by the first policy based on the second electronic data;
   determine eligible ones of the potential investors by matching the database of parameters with the generated cashflow projection;
   receive, from a second entity server device via an application interface to an electronic exchange network, an electronic offer for the first policy by the second entity server device based on an authorization including assignment data associated with an owner of the first policy, wherein the second entity server device issues to the owner, in exchange for the owner assigning the first policy to the second entity server device according to the assignment data, at least one second policy based on a market value of the first policy, the at least one second policy including a second benefit value on the life of the insured comprising a portion of the first benefit value wherein the owner is not required to pay premiums to keep the second policy in force, the offer comprising offer data including an offer price for the first policy and details regarding the first policy;
   control electronic access to the offer by limiting disclosure of the offer data to the eligible ones of the potential investors through the electronic exchange network;
   receive, via the application interface to the electronic exchange network, a bid from a client device of a given eligible investor that is responsive to the offer, the bid including a bid price;
   receive an acceptance of the bid based on a signal from the second entity server device;
   execute a transaction workflow including generating an agreement between the second entity server device and the client device of the given eligible investor associated with the bid, the agreement comprising the given eligible investor receiving the first policy from the second entity server device and
   (i) the given eligible investor paying premiums to the first entity that keep the first policy in force, (ii) the given eligible investor paying a fee to the second entity server device corresponding to the bid price, and (iii) responsibility of the given eligible investor for paying or causing to be paid to the second entity server device, the second benefit value based on the life of the insured according to the second policy, and
   generate, via the application interface, a notification of a sale of the first policy based on the agreement from the transaction workflow to the second entity server device and the client device.

2. The system of claim 1 wherein the assignment is based on a transaction executed by the owner of the first policy with the second entity server device.

3. The system of claim 1 wherein the processing device is further configured to electronically receive the assignment via data entry or file attachment from a computing device associated with the owner of the first policy.

4. The system of claim 1 wherein the processing device is further configured to issue the second policy as a paid-up certificate of insurance under a group master policy.

5. The system of claim 1 wherein the processing device is further configured to issue the second policy as an individual paid-up life insurance policy.

6. The system of claim 1 wherein processing device is further configured to issue the second policy to the owner wherein the second policy includes a beneficiary that is chosen by the owner.

7. The system of claim 1 wherein the processing device is further configured to issue the second policy to the owner wherein the first entity pays the first benefit value on the life of the insured to the buyer, the buyer pays or causes to be paid at least the second benefit value on the life of the insured to the second entity server device, and the second entity server pays the second benefit value on the life of the insured to a beneficiary of the second policy.

* * * * *